US 9,577,719 B2

(12) United States Patent
Ota

(10) Patent No.: US 9,577,719 B2
(45) Date of Patent: Feb. 21, 2017

(54) WIRELESS DEVICE AND NEAR-FIELD WIRELESS COMMUNICATION METHOD

(71) Applicant: Icom Incorporated, Osaka-shi, Osaka (JP)

(72) Inventor: Futoshi Ota, Osaka (JP)

(73) Assignee: ICOM INCORPORATED, Osaka (JP)

( * ) Notice: Subject to any disclaimer, the term of this patent is extended or adjusted under 35 U.S.C. 154(b) by 0 days.

(21) Appl. No.: 14/643,081

(22) Filed: Mar. 10, 2015

(65) Prior Publication Data

US 2015/0263793 A1   Sep. 17, 2015

(30) Foreign Application Priority Data

Mar. 13, 2014   (JP) ................................ 2014-050058

(51) Int. Cl.
H04B 7/00 (2006.01)
H04B 5/02 (2006.01)
H04W 4/10 (2009.01)
H04B 5/00 (2006.01)

(52) U.S. Cl.
CPC .............. *H04B 5/02* (2013.01); *H04B 5/0031* (2013.01); *H04W 4/10* (2013.01)

(58) Field of Classification Search
None
See application file for complete search history.

(56) References Cited

U.S. PATENT DOCUMENTS

| 2006/0034231 | A1* | 2/2006 | Tailor | H04W 88/02 |
| | | | | 370/338 |
| 2008/0125042 | A1 | 5/2008 | Kim | |
| 2009/0053997 | A1* | 2/2009 | Jobling | G06F 3/01 |
| | | | | 455/41.2 |
| 2009/0076827 | A1* | 3/2009 | Bulitta | 704/275 |
| 2011/0034125 | A1* | 2/2011 | Preston | H04M 1/6066 |
| | | | | 455/41.2 |
| 2011/0143664 | A1* | 6/2011 | Fuccello | H04M 1/72519 |
| | | | | 455/41.2 |
| 2013/0089080 | A1* | 4/2013 | Singer | G06F 13/385 |
| | | | | 370/338 |
| 2014/0009305 | A1* | 1/2014 | Schultz | B25B 23/14 |
| | | | | 340/870.01 |

FOREIGN PATENT DOCUMENTS

JP   2008-141744   6/2008

* cited by examiner

*Primary Examiner* — Zhiyu Lu
(74) *Attorney, Agent, or Firm* — Norris McLaughlin & Marcus, P.A.

(57) ABSTRACT

The data to be supposed to be processed by a microcontroller unit (MCU) of the near-field wireless communication module in a wireless device is processed by a digital signal processor (DSP) of the module instead of the MCU in order to expedite processing of commands.

8 Claims, 4 Drawing Sheets

| data size (byte) | this invention | |
|---|---|---|
| | processing time (s) | converted communication speed (bps) |
| 32 | 1.21 | 42K |
| 64 | 1.71 | 59K |
| 96 | 1.97 | 77K |
| 128 | 2.25 | 91K |
| 192 | 2.81 | 109K |
| 256 | 3.37 | 121K |

FIG. 5

| data size (byte) | convertional example | | this invention | |
|---|---|---|---|---|
| | processing time (s) | converted communication speed (bps) | processing time (s) | converted communication speed (bps) |
| 32 | 11.5 | 4.4K | 2.6 | 19K |
| 64 | 18.5 | 5.5K | 2.7 | 37K |
| 96 | 23.5 | 6.5K | 2.78 | 55K |
| 128 | 26.0 | 7.8K | 2.84 | 72K |
| 192 | 26.0 | 11.8K | 2.87 | 107K |
| 256 | 26.0 | 15.7K | 2.9 | 141K |

WIRELESS DEVICE AND NEAR-FIELD WIRELESS COMMUNICATION METHOD

BACKGROUND OF THE INVENTION

Field of the Invention

The invention relates to a wireless device and a near-field wireless communication method.

Description of the Related Art

Some conventional wireless communication apparatus comprise a wireless device and a headset, each of which, in order to accommodate the users' needs, is provided with a PTT (Push to Talk) switch pressed down by the users for communication. In such wireless communication apparatus, it is demanded that the users' convenience should be further enhanced by enabling communication between the headset and the wireless device to be wirelessly made.

Japanese Unexamined Patent Publication No. 2008-141744, as a technique to meet such demand, discloses a wireless communication apparatus, wherein a wireless device is combined with a wireless headset, being compliant with a near-field wireless communication protocol, for example, Bluetooth (registered trademark) protocol.

The wireless device is embedded with a near-field wireless communication module to perform near-field wireless communication with the wireless headset, in order to achieve transmission-reception switching control of the wireless device through manipulation of the PTT switch of the wireless headset. The near-field wireless communication module is provided with a microcontroller unit (hereinafter, MCU) and a digital signal processor (hereinafter, DSP). Software installed in the MCU includes an HCI (including a host controller interface) firmware layer that controls the Bluetooth module and also controls the HCI to wirelessly transmit and receive data, and an application layer which is the highest layer of the communication protocol.

To effectuate a transmission-reception switching control of the wireless communication apparatus by manipulating the PTT switch through the near-field wireless communication, the near-field wireless communication protocol requires a profile associated with handling of the PTT switch. The existing near-field wireless communication protocol lacks such a profile. Then, it is needed to prepare a dedicated wireless serial communication command (hereinafter, PTT command) in order to enable the transmission-reception switching control of the wireless communication apparatus by manipulating the PTT switch through the near-field wireless communication. The PTT command is a dedicated command for realizing the transmission-reception switching control of the wireless communication apparatus through the manipulation of the PTT switch, for which a serial port profile (hereinafter, SPP) is used. The SPP is one of the profiles of the Bluetooth being a protocol implemented per device type. The SPP serves to connect two devices via a virtual serial port. Existing wireless serial communication commands and PTT commands, which are received via the SPP, are processed by software implemented in the application layer. In the existing near-field wireless communication, however, the priority order of processes carried out in the HCI firmware layer is higher than that of processes carried out in the application layer.

Such prioritization consequently retards processing of the PTT command in the application layer. Any retardation of the PTT command processing is a drawback when the transmission-reception switching control of the wireless communication apparatus is effectuated by manipulating the PTT switch through the near-field wireless communication.

This problem is particularly notable when the PTT command is processed by means of the wireless headset through the near-field wireless communication. Between the headset and the wireless device is performed voice data communication as well as processing of the PTT command associated with the wireless serial communication. In the existing near-field wireless communication, however, the priority order of tae voice data processing is higher than that of processing of the commands associated with the wireless serial communication. Therefore, the voice data is processed prior to the commands associated with the wireless serial communication, which makes it more difficult to accelerate the communication.

Wirelessly connecting between the wireless device and a data terminal device (including generally called tablet terminal) through near-field wireless communication, these are connected wirelessly via the virtual serial port, and then SPP-compliant wireless serial communication is performed between them. However, data received via the SPP, as with the PTT command described above, is processed by the software implemented in the application layer of the near-field wireless communication module. Then, processing of the data received via the SPP is retarded for the same reason described above, which is a bottleneck to be dealt with in order to perform the wireless serial, communication between the wireless device and the data terminal.

SUMMARY OF THE INVENTION

Accordingly, an objective of the invention is to provide a wireless device advantageous in that command processing can be expedited during communication via a virtual serial port (wireless serial communication) through near-field wireless communication.

In order to achieve the above objective, a wireless device according to the invention comprises a near-field wireless communication module for performing near-field wireless communication with an external communication terminal, wherein data to be processed by a microcontroller unit (MCU) of the near-field wireless communication module is processed by, instead of the MCU, a data signal processor (DSP) of the near-field wireless communication module.

A near-field wireless communication method according to the invention performs near-field wireless communication between a wireless device and an external communication terminal, wherein data to be processed by the MCU of the near-field wireless communication module is processed by instead of the MCU, the DSP of the near-field wireless communication module.

The technical advantages of the invention are described below in further detail. A near-field wireless communication module is incorporated in the wireless device to perform near-field wireless communication with a communication terminal compliant with the near-field wireless communication protocol. The near-field wireless communication module includes an MCU and a DSP. In the software installed in the MCU, a host controller interface (HCI) firmware layer and an application layer is included. A wireless serial communication command required for the near-field wireless communication is processed by software implemented in the application layer. As described earlier, in the existing near-field wireless communication, the priority order of the process executed in the application layer is lower than that of the process executed in the HCI firmware layer, which adversely retards processing of the wireless serial communication command by the software implemented in the application layer. This becomes a drawback when performing communication via the virtual serial port through the near-field wireless communication (wireless serial communication).

Therefore, the invention is directed at usefully taking advantage of the DSP provided in the near-field wireless communication module. The data to be supposed to be processed by the MCU of the near-field wireless communication module is, for example, data associated with wireless serial communication which is necessary for the near-field wireless communication performed by the software implemented in the application layer. The invention, processes (processes command interpretation, etc.) such data by not the MCU but the DSP of the near-field wireless communication module. As a result, the wireless serial communication command can be speedily processed independent of the priority orders of processes under the existing near-field wireless communication protocol.

At the time of processing the PTT using the wireless headset through the near-field wireless communication, in the processing under the existing near-field wireless communication protocol, the communication via the virtual serial port in the near-field wireless communication (wireless serial communication) is made with voice data processing performed preferentially. Therefore, there is a possibility that makes it even more difficult to accelerate the wireless serial communication. In contrast, according to the invention, in the near-field wireless communication module, the data to be supposed to be processed by the MCU thereof (for example, command associated with the wireless serial communication) is processed not by the MCU, but by the DSP of the near-field wireless communication module. As a result, it is possible to effectively avoid the risk of retarding the wireless serial communication due to giving a higher priority order to the voice data processing, which can further increase the processing speed.

According to an aspect of the invention, the wireless device is further characterized in that, the data to be processed by the MCU of the near-field wireless communication module is data associated with wireless serial communication performed via a virtual serial port through the near-field wireless communication, and the near-field wireless communication module comprises:

a discriminator for discriminating whether the data associated with the near-field wireless communication is the data associated with the wireless serial communication or any other data; and a controller for outputting the data associated with the wireless serial communication discriminated from the data associated with the near-field wireless communication by the discriminator to the digital signal processor to process the outputted data.

According to an aspect of the invention, the near-field wireless communication method is further characterized in that, the data to be processed by the MCU of the near-field wireless communication module is data associated with wireless serial communication performed via a virtual serial port through the near-field wireless communication, the near-field wireless communication method including:

a discriminating step for discriminating whether the data associated with the near-field wireless communication is the data associated with the wireless serial communication or any other data; and a controlling step for outputting the data associated with the wireless serial communication discriminated from the data associated with the near-field wireless communication by the discriminator to the digital signal processor to process the outputted data.

According to these aspects, the discriminator discriminates whether the data associated with the near-field wireless communication is the data associated with the wireless serial communication (for example, command) or any other data. After the data associated with the wireless serial communication is discriminated from the data associated with the near-field wireless communication by the discriminator, the controller outputs the discriminated data to the digital signal processor to be processed by the digital signal processor, and as a result, the invention can be implemented with minimum configuration.

The wireless device and the near-field wireless communication method according to the invention are further characterized in that the data to be processed by the MCU of the near-field wireless communication module is a command.

According to another aspect of the invention, the wireless device is further characterized in that, the communication terminal is a wireless headset comprising a PTT switch used for transmission-reception switching control of the wireless device, the wireless serial communication includes data communication associated with the transmission-reception switching control of the wireless device, and the near-field wireless communication module further comprises a PTT switch operation controller, the PTT switch operation controller skips a preventive process against chattering-induced malfunctions resulting from the PTT switch during a first mode of the PTT switch, and the PTT switch operation controller carries out the preventive process against chattering-induced malfunctions resulting from the PTT switch during a second mode of the PTT switch, during the first mode, the wireless device is rendered ready for transmission when the PTT switch is pressed down but is rendered ready for reception when the pressed-down PTT switch is released, and during the second mode, the wireless device is rendered ready for transmission and ready for reception alternately every time when the PTT switch is pressed down.

According to another aspect of the invention, the near-field wireless communication method is further characterized in that, the communication terminal is a wireless headset comprising a PTT switch used for transmission-reception switching control of the wireless device, and the wireless serial communication includes data communication associated with the transmission-reception switching control of the wireless device, the near-field wireless communication method further including:

a preventive step for skipping a preventive process against chattering-induced malfunctions resulting from the PTT switch during a first mode of the PTT switch, the preventive step carrying out the preventive process against chattering-induced malfunctions resulting from the PTT switch during a second mode of the PTT switch, during the first mode, the wireless device is rendered ready for transmission when the PTT switch is pressed down but is rendered ready for reception when the pressed-down PTT switch is released, and during the second mode, the wireless device is rendered ready for transmission and ready for reception alternately every time when the PTT switch is pressed down.

The operational advantages described below can be obtained by these aspects of the invention. When an operator presses the PTT switch down or releases the pressed-down PTT switch, chattering may occur, possibly causing malfunctions. To avoid such malfunctions, some process to prevent chattering-induced malfunctions is necessary, for example, adjusting a sampling period to be slightly longer. The chattering-induced malfunction preventive process, however, may prolong an overall processing time. The following facts can be learnt from circumstantial analysis of the operation of the interior of the wireless device during the first and second modes.

Unless the chattering-induced malfunction preventive process is carried out, the occurrence of chattering-induced malfunctions is naturally more likely when the PTT switch is pressed down or the pressed-down PTT switch is released. Turning to data transmission and reception between a CPU and a wireless unit in the wireless device, it takes a certain length of waiting time to start the data transmission and reception (waiting time for the wireless device to be locked for transmission or reception). Another fact to be noted is that the PTT switch remains pressed or unpressed during the first mode. During the first mode, therefore, the PTT switch can be either pressed or unpressed without the chattering-induced malfunction preventive process because the certain length of waiting time stands in for the chattering-induced malfunction preventive process, thereby avoiding such malfunctions. The chattering-induced malfunction preventive process is omitted during the first mode of the PTT switch, while the preventive process is carried out during the second mode of the PTT switch alone. The omission of the chattering-induced malfunction preventive process during the first mode can shorten the overall processing time, Thus, the invention can expedite processes, such as processing commands, performed by an application running on the host of the wireless device when communication is performed through a virtual serial port (wireless serial communication) during the near-field wireless communication.

BRIEF DESCRIPTION OF THE DRAWINGS

These and other objects as well as advantages of the invention will become clear by the following description of an embodiment of the invention. A number of benefits not recited in this specification will come to the attention of those skilled in the art when they actualize the present invention.

FIG. 5 is a second table showing characteristics of the wireless device according to the invention and characteristics of a conventional example.

DETAILED DESCRIPTION OF THE INVENTION

Hereinafter, a wireless device according to the invention is described in detail referring to the accompanying drawings illustrating an embodiment of the invention.

Figure 1:
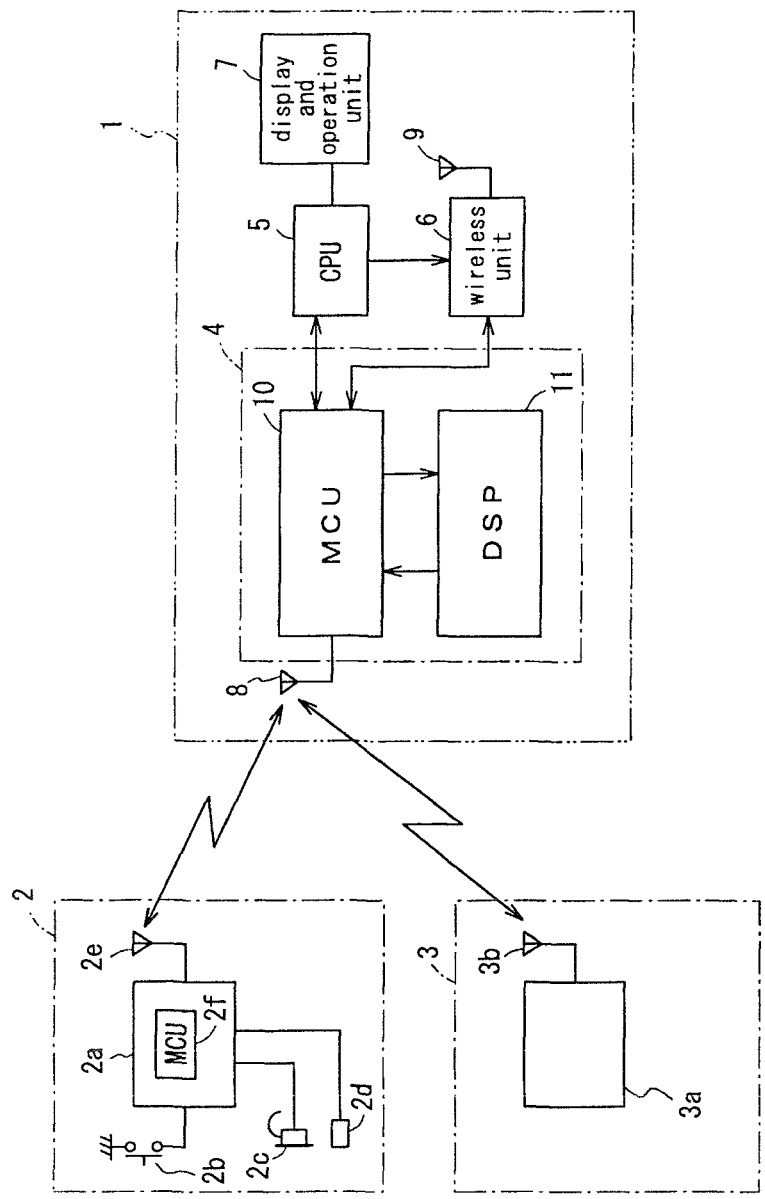
FIG. 1 is a block diagram illustrating the structure of a wireless communication apparatus according to an embodiment of the invention.
Figure 2:
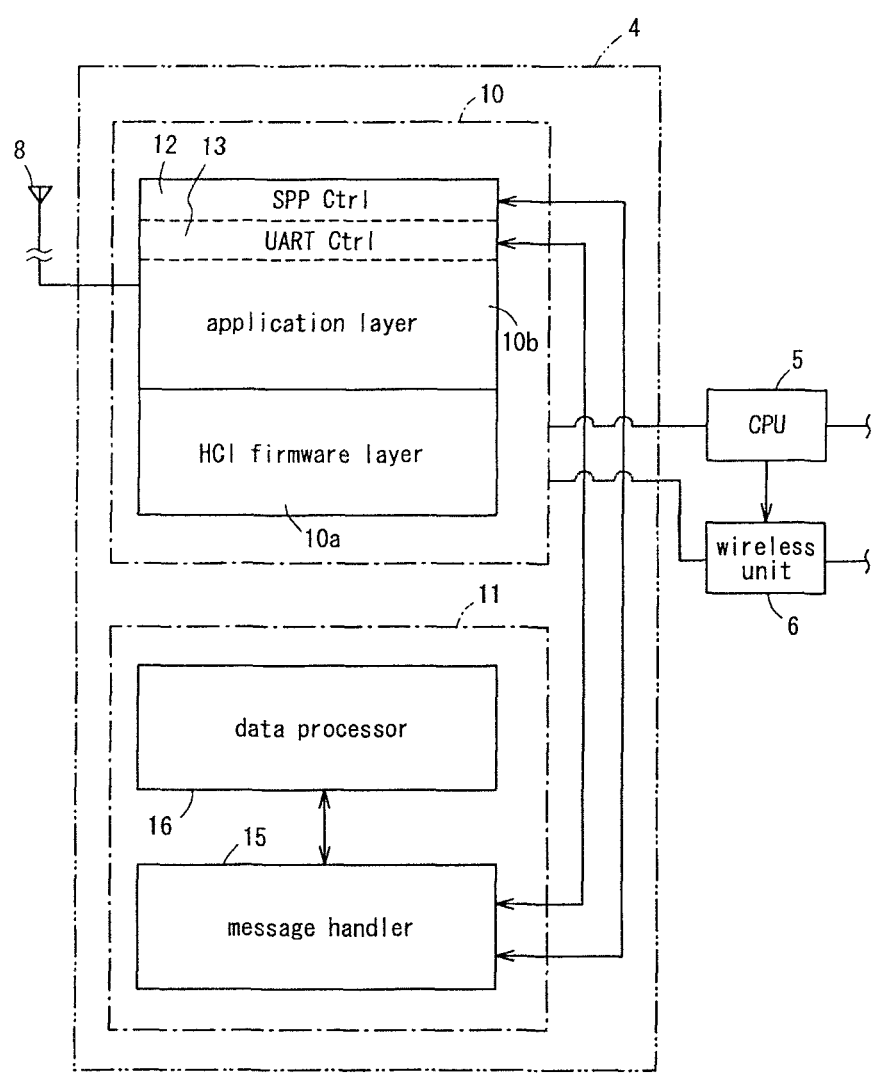
FIG. 2 is a block diagram illustrating principal parts of a wireless device according to the embodiment.
Figures 3, 4:
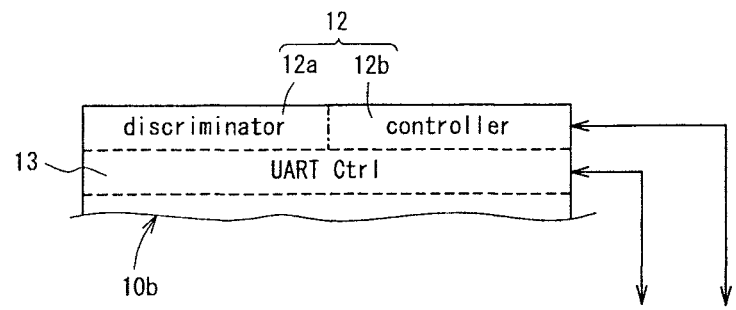
FIG. 3 is a block diagram illustrating further principal parts of the wireless device according to the embodiment.
FIG. 4 is a first table showing characteristics of the wireless device according to the invention.

Referring to reference numerals illustrated in the block diagrams of FIGS. 1 to 3, numeral 1 denotes a wireless device, 2 denotes a wireless headset, and 3 denotes a data terminal. The wireless headset 2 is an example of communication terminals furnished with a function to remotely control the wireless device 1 through near-field wireless communication. The wireless device 1, wireless headset 2, and data terminal 3 constitute a wireless communication apparatus. The wireless device 1 is furnished with a wireless communication function and also with a function to perform near-field wireless communication, such as Bluetooth communication, with the wireless headset 2 and the data terminal 3. The wireless headset 2 is, for example, worn on an, operator's head to transmit and receive voice data to and from the wireless device 1 through near-field wireless communication. The wireless headset 2 comprises a near-field wireless communication module 2a, a PTT (push to talk) switch 2b, an earphone or headphone 2c, a microphone 2d, and a near-field, wireless antenna 2e. The near-field wireless communication module 2a comprises a microcontroller unit (hereinafter, MCU) 2f. The MCU 2f constitutes a. PTT operation controller that controls the operation of PTT in the wireless headset 2. The data terminal 3 transmits and, receives various data to and from the wireless device 1 through near-field wireless communication. The data terminal 3 comprises a near-field wireless communication module 3a and a near-field wireless antenna 3b. FIG. 1 illustrates a monaural headphone as an example of the earphone or headphone 2c, which, however, is not necessarily limited to the monaural headphone.

The wireless device 1 comprises a near-field wireless communication module 4 for performing near-field wireless communication with the wireless headset 2 and the data terminal 3, a CPU 5 that controls the whole wireless device, a wireless unit 6 that wirelessly communicates with another wireless device not illustrated in the drawings, a display and operation unit 7 that displays thereon indications relating to the operation of the wireless device 1 and accepts operational instructions inputted, by an operator who operates the wireless device, a near-field, wireless antenna 8 for transmitting and receiving data through near-field wireless communication with the wireless headset 2 and the data terminal 3, and a wireless antenna 9 for wirelessly transmitting and receiving data to and from another wireless device not illustrated, in the drawings.

The near-field wireless communication module 4 comprises an MCU 10 and a digital signal processor (hereinafter, DSP) 11. The MCU 10 comprises an HCI firmware layer 10a and an application layer 10b. Under the control by a virtual machine (hereinafter, VM), software implemented in the application layer 10b is run. The VM is a framework or software that emulates the operations of the HCI firmware layer 10a and the application layer 10b. In the HCI firmware layer 10a is implemented an HCI firmware that is run based on the protocol of HCI (host controller interface). The HCI firmware includes software for control of the near-field wireless communication.

In the application layer 10b are implemented host software and an application running on the host software. The application implemented, in the application layer 10b includes a SPP controller 12, and a UART controller 13. The UART controller 13 controls UART (universal asynchronous receiver transmitter) that transmits, for example, a wireless serial, communication command for transmission-reception switching control of the wireless device 1 by manipulation of the PTT switch through the near-field, wireless communication.

The SPP controller 12 comprises a discriminator 12a and a controller 12b. The discriminator 12a discriminatively extracts a command for Bluetooth profile for near-field wireless communication and any other data from among data processed when carrying out the host software implemented in the application layer 1ab and the application running on the host software. Any independent commands other than the command for Bluetooth profile also are discriminated as "command", as with the command for Bluetooth profile. Hereinafter, the command for Bluetooth profile and any independent commands are collectively called "commands". An example of the independent commands according to this embodiment is, for example, a PTT command. The discriminator 12a analyzes the data structure of inputted data to discriminate the commands from any other data. Specifically, the discriminator 12a discriminates the commands from any other data based on a header appended to the top of data and a footer appended to the end of data. The commands are processed in the DSP 11, and the controller 12b receives the processed commands from the DSP 11. If necessary, the controller 12b transfers the processed commands received from the DSP 11 to the host software or application of the application layer 10b.

The UART controller 13 is in charge of communication control of serial data transmitted and received between the MCU 10 and the CPU 5 of the wireless device 1.

The DSP 11 comprises a message handler 15 and a data processor 16. The message handler 15 transmits and receives messages (including data such as commands) to and from the MCU 10 (specifically, controller 12b). The data processor 16 processes the messages (such as commands) that the message handler 15 received from the MCU 10, and returns the processed messages to the message handler 15.

In the near-field wireless communication module 4 of the wireless device 1 according to this embodiment, the DSP 11 interprets the commands discriminated by the discriminator 12a.

As a first example of the near-field wireless communication by the wireless device 1 are described below processes executed for transmission-reception switching control of the wireless device 1 by manipulating the PTT switch through the near-field wireless communication by the use of the wireless headset 2.

To start with, an operator operates the display and operation unit 7 of the wireless device 1 to set a first mode or a second mode in the PTT switch. The first mode is a mode during which the wireless device 1 is rendered ready for transmission when the PTT switch 2h is pressed down by the operator but is rendered ready for reception when the PTT switch 2b is not pressed (PTT function). The second mode is a mode during which the wireless device is rendered ready for transmission and ready for reception alternately every time when the PTT switch is pressed down (one-touch PTT function).

When one of the first and second modes is set, the wireless device 1 notifies the wireless headset 2 of the set mode through the near-field wireless communication. The MCU 2f of the wireless headset 2 decides whether a chattering-induced malfunction preventive process should be carried out based on the information notified by the wireless device 1, which will be described in detailed later. One of the first and second modes set in the PTT switch is displayed on the display and operation unit 7, so that the operator can visually check whether the set mode is the first mode or the second mode. The display and operation unit 7 also displays thereon whether the wireless device 1 is ready for transmission or reception, so that the operator can visually check the operational state of the wireless device 1.

When these initial setting processes are completed, the operator wears the wireless headset 2 on his/her head, and then operates the wireless device 1 by manipulating the PTT switch 2b of the wireless headset 2. The communication between the wireless device 1 and the wireless headset 2 is performed through near-field wireless communication.

There are four patterns with the transmission-reception switching control through manipulation of the PTT switch 2b of the wireless headset 2, first pattern: first mode is set, and the operation starts with transmission second pattern: second mode is set, and the operation starts with transmission third pattern: first mode is set, and the operation switches from transmission to reception, and fourth pattern: second mode is set, and the operation switches from transmission to reception.

When the initial setting processes are completed, the wireless device 1 is ready for reception and waits for radio wave to arrive. Then, the operator follows the first pattern or the second pattern to render the wireless device 1 ready for transmission. The wireless device 1, unless currently performing data transmission, is mandatorily set to the ready-for-reception state.

The former stage of the first pattern is described. When the operator confirms that the wireless headset 2 is set to the first mode from the display of the display and operation unit 7, the operator presses down the PTT switch 2b of the wireless headset 2, and speaks to the microphone 2d while keeping the PTT switch 2h pressed down. The microphone 2d converts his/her voice into an electrical signal. In the near-field wireless communication module 2a, the electrical signal is converted into a near-field wireless signal (voice), and then transmitted to the wireless device 1 via the near-field wireless antenna 2e. The MCU 10 of the wireless device 1 receives the near-field wireless signal (voice) via the near-field wireless antenna 8 and converts the received near-field wireless signal (voice) into an electrical signal (voice). The MCU 10 then sends the converted electrical signal to software installed to process voice data (hereinafter, voice processing software).

The former stage of the second pattern is described. When the operator confirms that the wireless headset 2 is set to the second mode from the display of the display and operation unit 7, the operator presses down the PTT switch 2b of the wireless headset 2 once. Then, the operator speaks to the microphone 2d while leaving the PTT switch 2b unpressed until the next time when he/she presses the PTT switch 2.b down. The microphone 2d converts the speaker's voice into an electrical signal. In the near-field wireless communication module 2a, the electrical signal is converted into a near-field wireless signal (voice), and then transmitted to the wireless device 1 via the near-field wireless antenna 2e. The MCU 10 receives the near-field wireless signal (voice) via the near-field wireless antenna 8, and processes the received near-field wireless signal (voice) using the voice processing software.

The other processes including the latter stages of the first and second patterns are now described. In the former stages of the first and second patterns, the near-field wireless communication module 2a of the wireless headset 2 transmits the voice data and the PTT command that conforms to the operational state of the PTT switch 2b to the wireless device 1 via the near-field wireless antenna 2e as a near-field wireless signal (data). The MCU 10 of the near-field wireless communication module 4 of the wireless device 1 receives the near-field wireless signal (data) from the wireless headset 2 via the near-field wireless antenna 8. The MCU 10 then transmits the received near-field wireless signal (data) to the discriminator 12a of the SPP controller 12.

When the discriminator 12a detects that the received data contains the commands including the PTT command, the discriminator 12a notifies the controller 12b of the SPP controller 12 of the information. The controller 12b notified of the information transmits the command-containing data to the message handler 15 of the DSP 11. The message handler 15 controls the data processor 16 to process the received data and sends the processed data back to the controller 12b.

The controller 12b receives the processed data and then transmits the received data to the CPU 5 via the UART. Depending on whether the set mode is the first mode or the second mode, the CPU 5 detects whether the PTT switch 2b is pressed or unpressed based on the received data to decide whether the wireless unit 6 should be set to the ready-for-transmission state or the ready-for-reception state.

Specifically, the CPU 5 controls the wireless device 1 to be ready for transmission in the following two cases.
the PTT switch 2b is kept pressed during the first mode, and
the PTT switch 2b is pressed down an odd number of times during the second mode.

On the other hand, the CPU 5 determines that the wireless device 1 is ready for reception in the following two cases,
the PTT switch 2b is unpressed during the first mode,
the PTT switch 2b is never pressed or pressed down an even number of times during the second mode.

In either of the first and second patterns, the CPU 5 checks whether any of the before-mentioned conditions is met to determine whether the wireless device 1 is ready for transmission or reception. When the wireless device 1 is determined as ready for transmission, a process to transmit data starts.

The MCU 10, if necessary, executes the voice process to the near-field wireless signal (voice) received via the near-field wireless antenna 8 concurrently with the interpretation of the PTT command by the DSP 11. The MCU 10 then converts the processed near-field, wireless signal into an analog voice signal and outputs the converted analog voice signal to the wireless unit 6. The CPU 5 modulates the inputted analog voice signal, and controls the wireless unit 6 to transmit the modulated analog voice signal to another wireless device (not illustrated in the drawings) via the wireless antenna 9.

Describing the third pattern, when the operator confirms that the wireless headset 2 is set to the first mode from the display of the display and operation unit 7, the operator releases the pressed-down (ready for transmission) PTT switch 2b of the wireless headset 2 (switched to be ready for reception) or presses down the unpressed (ready for reception) PTT switch 23 (switched to be ready for transmission). The operator then carries out the transmission or reception process described earlier, while keeping the changed operational state of the PTT switch 2b. In response to that, the near-field wireless communication module 2a transmits the PTT command that conforms to the operational state of the PTT switch 2b to the wireless device 1 via the near-field wireless antenna 2e as a near-field wireless signal (data). The MCU 10 of the near-field wireless communication module 4 of the wireless device 1, upon receiving the near-field wireless signal (data) from the wireless headset 2 via the near-field wireless antenna 8, transmits the received near-field wireless signal (data) to the discriminator 12a of the SPP controller 12.

The discriminator 12a performs the data discrimination of the received data. The discriminator 12a, when detecting that the received data contains the commands such as PTT command, notifies the controller 12b of the SPP controller 12 of the information. The controller 12b notified of the information sends the data to the message handler 15 of the DSP 1.1. The message handler 15 controls the data processor 16 to process the received data and sends the processed data back to the controller 12b.

The controller 12 receives the processed data and then transmits the received data to the CPU 5 via the UART. In accordance with the set mode, first mode or second mode, the CPU 5 detects based on the received data whether the pressed-down PTT switch 2b has been released, and then switches the wireless unit 6 currently ready for transmission to be ready for reception.

When radio wave arriving from another wireless device is inputted by another wireless device when the wireless device is ready for reception, the voice signal demodulated by the wireless unit 6 is transmitted to the wireless headset 2 via the MCU 10 of the near-field wireless communication module 4, and then outputted from the earphone or headphone 2c of the wireless headset 2.

Describing the fourth pattern, when the operator confirms that the wireless headset is set to the second mode from the display of the display and operation unit 7, the operator presses down the PTT switch 2b of the wireless headset 2 once to switch the wireless device 1 currently ready for transmission to be ready for reception or switch the wireless device 1 currently ready for reception to toe ready for transmission. Then, the operator carries out the transmission or reception process in accordance with the operational state. In response to that, the near-field wireless communication module 2a transmits the PTT command that conforms to the operational state of the PTT switch 2b to the wireless device 1 via the near-field wireless antenna 2e as a near-field wireless signal (data). The MCU 10 of the near-field wireless communication module 4 of the wireless device 1, upon receiving the near-field wireless signal (data) from the wireless headset 2 via the near-field wireless antenna 8, transmits the received near-field wireless signal (data) to the discriminator 12a of the SPP controller 12.

The discriminator 12a performs the data discrimination of the received data. The discriminator 12a, when detecting that the received data contains the commands such as PTT command, notifies the controller 12b of the SPP controller 12 of the information. The controller 12b notified of the information sends the data to the message handler 15 of the DSP 11. The message handler 15 controls the data processor 16 to process the received data and sends the processed data back to the controller 12b.

The controller 12 receives the processed data and then transmits the received data to the CPU 5 via the UART. The CPU 5 confirms the second mode and whether the latest status of the wireless device is ready for transmission or reception. Then, the CPU 5, when detecting based on the received data that the PTT switch 2b has been pressed down, switches the wireless unit 6 to be ready for transmission or reception.

The operation when the wireless unit 6 is determined as ready for transmission is exactly as described in detail regarding the first pattern, which is not described again. When radio wave arriving from another wireless device is received by the wireless device 1 ready for reception, the voice signal demodulated the wireless unit 6 is transmitted to the wireless headset 2 via the MCU 10 of the near-field wireless communication module 4 and then outputted from the earphone or headphone 2c of the wireless headset 2.

The CPU 5 notifies the wireless unit 6 of the decision (transmission-reception switching control). Concurrently with the transmission-reception switching control, the following processes are carried out. When the wireless device is ready for transmission, an electrical signal (voice) to be transmitted is inputted from the wireless headset 2 to the voice processing software. The electrical signal (voice) to be transmitted is voice-processed by the voice processing software, and then converted into an analog voice signal and inputted to the wireless unit 6. The wireless unit 6 notified of the transmission-reception switching control modulates the inputted analog voice signal and transmits the modulated analog voice signal to another wireless device (not illustrated in the drawings) via the wireless antenna 9. When the wireless device is ready for reception, the wireless unit 6 notified of the transmission-reception switching control demodulates the radio wave transmitted from another wireless device via the wireless antenna 9 and outputs the demodulated result to the MCU 10 of the near-field wireless communication module 4. The MCU 10 voice-processes the demodulated signal inputted thereto from the wireless unit 6 using the voice processing software, and outputs the voice-processed signal to the wireless headset 2 via the near-field wireless antenna 8.

In the processes of these first to fourth pattern described so far, a chattering-induced malfunction preventive process, which is described below, is underway in the wireless headset 2. When the operational state of the PTT switch 2b is changed, chattering-induced malfunctions may occur. To avoid that, some preventive process is required to avoid such malfunctions, for example, adjusting a sampling period to be slightly longer. Such a process, however, unfavorably prolongs an overall processing time. On the other hand, if the PTT switch 2b is pressed down or pressed-down PTT switch is released, the occurrence of chattering-induced malfunctions is naturally more likely without unless the chattering-induced malfunction preventive process is carried out. There are two facts, however, that may be effective solutions; it takes a certain period of waiting time (waiting time for the wireless device to be locked for transmission or reception) to start data transmission and reception between the CPU 5 and the wireless unit 6, and the PTT switch remains pressed or unpressed during the first mode. During the first mode, the PTT switch can be either pressed or unpressed without the chattering-induced malfunction preventive process because the certain length of waiting time stands in for the chattering-induced malfunction preventive process, thereby avoiding such malfunctions. In the wireless headset 2, therefore, the chattering-induced malfunction preventive process for the PTT switch 2b is omitted during the first mode, while the preventive process is carried, out during the second mode of the PTT switch 2b alone. This further expedites the processes during the first mode. According to this embodiment, the MCU 2f functions as a PTT switch operation controller.

The PTT command is different to data associated with core processes in the near-field wireless communication (data processed by the HCI firmware layer). In the processes of the first to fourth patterns described so far, therefore, the DSP 11 processes the PTT command, whereas the data associated with core processes in the near-field wireless communication is, as conventionally done, processed by the MCU 10 of the near-field wireless communication module 4. In the near-field wireless communication module 4 of the wireless device 1, the commands, instead of being processed by the MCU 10 that processes any data but the commands, are processed by the DSP 11. Conventionally processing of data associated with wireless serial communication is inconveniently retarded by the priority orders of the processes in the MCU 10. The wireless device according to this embodiment, however, can successfully avoid the problem.

FIG. 4 shows a result obtained by the wireless device according to the invention via the UART from data containing serial data transmitted and received to and from the MCU 10 of the near-field wireless communication module 4. The result specifically shows processing time average values and converted communication speeds with different data sizes demonstrated by repeatedly performed 100 loopback operations in each of which received data was returned. Though not illustrated in the drawings, the converted communication speeds are conventionally approximately 10 kbs when the data containing data transmitted and received through the UART is processed. It is very clear from the measurement result of FIG. 4 that the processing speeds of the wireless device according to the invention are four times higher.

FIG. 5 shows results obtained by the wireless device according to the invention and a conventional wireless device via the SPP from data containing control commands and any other serial data but the control commands. The results specifically show processing time average values and converted communication speeds with different data sizes demonstrated by repeatedly performed 100 loopback operations in each of which received data was returned. As compared to the converted communication speeds when the data is processed by a conventional device, the processing speeds of the wireless device according to the invention are approximately five to nine times higher.

Thus far, the most preferred embodiment of the invention was described in detail. Any parts described in the embodiment may be variously combined and/or arranged without departing from the spirit and the scope of the invention defined in the appended claims.

What is claimed is:

1. A wireless device, comprising a near-field wireless communication module for performing near-field wireless communication with an external communication terminal,
   wherein the near-field wireless communication module includes a microcontroller unit and a digital signal processor and the external communication terminal comprises a PTT switch;
   wherein the microcontroller unit comprises nontransitory storage media which implements an HCI firmware layer and an application layer, the HCI firmware layer controlling a bluetooth module and a host controller interface to configure the wireless device to perform near-field wireless communication to wirelessly transmit and receive data, and the application layer being a highest layer of a communication protocol;
   wherein in the near-field wireless communication a priority order of processes carried out in the application layer is lower than a priority order of processes carried out in the HCI firmware layer;
   wherein the microcontroller unit further includes a UART controller and an SPP controller;
   wherein the UART controller controls a universal asynchronous receiver transmitter that transmits a wireless serial communication command for transmission-reception switching control of the wireless device through manipulation of the PTT switch through the near-field wireless communication;

wherein the SPP controller discriminates whether data processed by the application layer includes a command for Bluetooth profile for near-field wireless communication or a PTT command, extracts the command for Bluetooth profile or the PTT command from among the data before the data is processed by the application layer, and transmits the extracted command to the digital signal processor, wherein the digital signal processor processes the command transmitted from the SPP controller; and wherein the SPP controller receives the processed command from the digital signal processor and transfers the processed command to the application layer.

2. The wireless device as claimed in claim 1, wherein the data associated with a near-field wireless communication requested by the application layer is data associated with wireless serial communication performed via a virtual serial port through the near-field wireless communication, and the near-field wireless communication module comprises:

a discriminator for discriminating whether the data associated with the near-field wireless communication is the data associated with the wireless serial communication or any other data; and wherein the controller is configured for outputting the data associated with the wireless serial communication discriminated from the data associated with the near-field wireless communication by the discriminator to the digital signal processor to process the outputted data.

3. The wireless device as claimed in claim 1, wherein the data associated with a near-field wireless communication requested by the application layer is a command.

4. The wireless device as claimed in claim 1, wherein the communication terminal is a wireless headset comprising a PTT switch used for transmission-reception switching control of the wireless device, the wireless serial communication includes data communication associated with the transmission-reception switching control of the wireless device, and the near-field wireless communication module further comprises a PTT switch operation controller, the PTT switch operation controller skips a preventive process against chattering-induced malfunctions resulting from the PTT switch during a first mode of the PTT switch, and the PTT switch operation controller carries out the preventive process against chattering-induced malfunctions resulting from the PTT switch during a second mode of the PTT switch, during the first mode, the wireless device is rendered ready for transmission when the PTT switch is pressed down but is rendered ready for reception when the pressed-down PTT switch is released, and during the second mode, the wireless device is rendered ready for transmission and ready for reception alternately every time when the PTT switch is pressed down.

5. A near-field wireless communication method for performing near-field wireless communication between a wireless device and an external communication terminal comprising a PTT switch, the wireless device comprising a near-field wireless communication module including a microcontroller unit and a digital signal processor, wherein the microcontroller unit includes a UART controller and an SPP controller, the method comprising:

implementing an HCI firmware layer and an application layer on the microcontroller unit, wherein the application layer is a highest layer of a communication protocol;

controlling a Bluetooth module and a host controller interface with the UART controller, as part of said implementing the HCI firmware layer, to configure the wireless device to perform near-field wireless communication to wirelessly transmit and receive data through manipulation of the PTT switch;

discriminating with the SPP controller whether data processed by the application layer includes a command for Bluetooth profile for near-field wireless communication or a PTT command, extracts the command for Bluetooth profile or the PTT command from among the data before the data is processed by the application layer, and transmits the extracted command to the digital signal processor, wherein the command transmitted from the SPP controller is processed by the digital signal processor and the SPP controller receives the processed command from the digital signal processor and transfers the processed command to the application layer;

executing first processes by the microcontroller unit, as part of said implementing the application layer, wherein a priority order of said first processes is lower than a priority order of second processes executed by said microcontroller unit, as part of said implementing the HCI firmware layer; and configuring the microcontroller unit to change processing of the application layer so that data associated with a near-field wireless communication requested by at least one of said first processes is instead processed for near-field wireless communication by the digital signal processor.

6. The method as claimed in claim 5, wherein the data associated with a near-field wireless communication requested by the application layer is data associated with wireless serial communication performed via a virtual serial port through the near-field wireless communication.

7. The method as claimed in claim 5, wherein the data associated with a near-field wireless communication requested by the application layer is a command.

8. The method as claimed in claim 5, wherein the communication terminal is a wireless headset comprising a PTT switch used for transmission-reception switching control of the wireless device, and the wireless serial communication includes data communication associated with the transmission-reception switching control of the wireless device, the near-field wireless communication method further including:

a preventive step for skipping a preventive process against chattering-induced malfunctions resulting from the PTT switch during a first mode of the PTT switch, the preventive step carrying out the preventive process against chattering-induced malfunctions resulting from the PTT switch during a second mode of the PTT switch, during the first mode, the wireless device is rendered ready for transmission when the PTT switch is pressed down but is rendered ready for reception when the pressed-down PTT switch is released, and during the second mode, the wireless device is rendered ready for transmission and ready for reception alternately every time when the PTT switch is pressed down.

\* \* \* \* \*